Aug. 12, 1941.  W. E. STACKHOUSE  2,251,964
APPARATUS FOR FILTERING GAS
Filed Feb. 14, 1938   2 Sheets-Sheet 1

Wilton E. Stackhouse
INVENTOR
BY Hugo G. Kemman
ATTORNEY

Aug. 12, 1941.   W. E. STACKHOUSE   2,251,964
APPARATUS FOR FILTERING GAS
Filed Feb. 14, 1938   2 Sheets-Sheet 2

Wilton E. Stackhouse
INVENTOR

BY Hugo G. Kemman
ATTORNEY

Patented Aug. 12, 1941

2,251,964

UNITED STATES PATENT OFFICE 2,251,964

APPARATUS FOR FILTERING GAS

Wilton E. Stackhouse, Lansdowne, Pa., assignor to The United Gas Improvement Company, a corporation of Pennsylvania Application February 14, 1938, Serial No. 190,372

4 Claims. (Cl. 183—45)

The present invention relates to apparatus for filtering gas.

In the distribution of manufactured gas, such as coal gas, coke oven gas, carburetted water gas and the like, considerable trouble is encountered due to the presence in the gas of particles of gum, termed vapor phase gum, formed in suspension by reaction between minute concentrations of oxides of nitrogen and certain hydrocarbons.

These gum particles are very small. The visible particles range upward from the threshold of visibility with the aid of the ultra microscope to particles of a diameter of 3 mu. though above 1 mu. they tend to settle out of the gas.

The formation of the particles proceeds throughout the distribution system as long as there is any nitric oxide present in the gas.

These gum particles block the small orifices of the control valves of low rate appliance burners, such as the needle valves of gas range and water heater pilots and needle valves controlling the flow of gas to gas refrigerator burners. The stoppage of the valves causes extinction of the burners, a source of nuisance and expense and in the case of automatic appliances, a possible source of danger.

The principal object of the present invention is to provide an efficient and economical method of and apparatus for filtering such small particles from the gas, prior to its passage through small control valves thereby avoiding their stoppage. Other objects will appear from the following description.

To avoid pilot trouble it is necessary to remove these gum particles very completely, as only an extremely small quantity of gum is required to block the needle valves of commonly used pilot burners, such for instance as the "Rutz" lighter, which in heavily gummed gas may be extinguished in four hours by only .000025 gram of gum. This is of the order of 1 pound of gum for 18 million pilot valves. The small quantity of gum serves to assist the collection on the needle valve of dirt, iron oxide, grease and fat, which in the absence of gum, rarely cause pilot trouble in manufactured gas systems.

It is therefore desirable to remove the gum completely. That is, the gas after passage through the filter should show no visible particles in the Tyndal beam and microscopic examination of valve needles should show no gum deposits.

Due to the continued formation of gum particles throughout the distribution system, the gas must be filtered at the appliances. This means that the filter must be small to permit application to existing appliances. Also the filter elements must be incombustible as they frequently must be installed in locations on appliances, which are at moderately high temperatures. Due to the low pressure of the gas at the appliance, the drop in pressure across the filter must be very low. Pressures in gas service and piping to appliances are very low as compared with pressures frequently employed in gas mains, for instance, transmission main pressures may be as high as 100 pounds per square inch but the usual service and house piping pressures, and hence the pressures at the appliances are of the order of from 3 to 8 inches of water column. With such low pressures only a very low pressure drop through the filter may be tolerated. Approximately 1 inch of water column is all that may be allowed in many distribution systems.

The filters must be of simple economical construction and must have relatively long life between servicing, as frequent servicing would consume the savings due to their use.

I have found that these very rigid and difficult requirements may be met by filtering the gas at the appliance through a pad of substantially uniformly packed glass cotton compressed to a density between 3.5 grams per cu. in. and 4.1 grams per cu. in. For gas flows causing pressure drops up to not materially exceeding one inch of water column, the glass cotton is preferably arranged in depth at least 0.5 in. and 0.25 in. and arranged in area sufficient to give the required gas flow without materially exceeding said pressure drop of 1 in. water column. Within the ranges given the required depth for complete gum removal varies inversely with the density.

The above is the preferred range of densities. Below a density of 3.5 grams per cu. in. a sufficiently uniform packing cannot be secured to insure with any reasonable depth a complete gum removal. Above a density of 4.1 grams per cu. in. other requirements prescribe a depth too small to insure sufficiently uniform density and freedom from channeling.

I have found, however, that if an occasional failure may be tolerated a density as low as 3.2 grams per cu. in. may be employed. Below that density, failures are too frequent for consideration.

The invention will be further described in connection with the attached figures which form a part of this specification and which are chosen for illustration of forms of the apparatus of the invention, and in which Figure 1 shows a vertical cross section of a filter for domestic gas range pilots.

Figure 1:
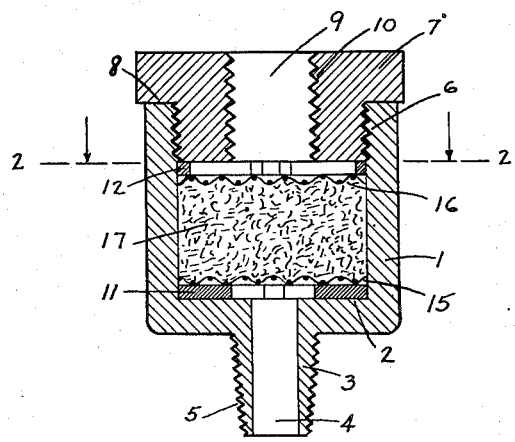

1 indicates a generally cylindrical filter chamber member, provided with an interior bore which constitutes the filter chamber. The member 1 is provided with the seat or shoulder 2 and with the lug 3, which is provided with the passage 4 communicating with the filter chamber. The lug 3 is further provided with pipe threads as indicated at 5. The interior bore of member 1 is threaded at 6 to engage the screw plug 7, which is adapted to be screwed into the bore and to seat in gas tight manner against the end of member 1 as indicated at 8. The screw plug is provided with the passage 9, which is furnished with pipe threads as shown at 10, and which communicates with the filter chamber. 11 and 12 are spiders provided with rims as 13 and arms as 14 and adapted to furnish support for screens 15 and 16. 17 is a filter pad of compressed glass cotton. For convenience in assembly and connection, the member 1 may be provided with wrench grips, as at 18, and the head of the screw plug 7 may be formed as a nut.

The interior bore is preferably accurately dimensioned in diameter and length, as also is the screw plug. The screws and spiders are preferably accurately formed in thickness. Such accurate dimensioning facilitates the securing of the proper glass cotton density in assembling the filter, as in such case a weighed quantity of glass cotton may be compressed to the desired volume, depth and density.

In so assembling the filter, the spider 11 is positioned against the seat 2 and the screen 15 placed abutting the spider. A weighed quantity of glass cotton is then placed in the filter chamber and the screen 16 and spider 12 positioned on the other side of it. The screw plug 7 is then introduced and tightened until it seats in gas tight contact with the end of member 1 as at 8, compressing the glass cotton within the chamber.

Accurate dimensioning of the parts predetermines the volume and depth occupied by the glass cotton after compression. The quantity of glass cotton selected by weighing is that which will give the density appropriate to the predetermined depth after compression to the predetermined volume.

The filter may be connected at either end to the pipe leading from the gas supply and at either end to the pipe leading to the pilot or other low rate gas consuming device.

In use the gas flows through the filter pad depositing therein the gum particles and other suspended solids, the screens and spiders serving to retain the glass cotton without unduly impeding the flow of the gas.

The spiders with their arms 14 serve to support the screens and prevent their bulging while transmitting the pressure for compressing the filter pad and further serve to provide gas spaces, which distribute the gas across the area of the pad.

As an example, a filter similar to that shown in Fig. 1 having a chamber bore of 0.75 inch, provided with a screw plug, screens and spider dimensioned to provide a space for glass cotton 0.5 inch deep after compression and provided with 0.8 gram of glass cotton will filter heavily gummed gas, delivering 0.75 cubic foot of gum free gas per hour without materially exceeding a pressure drop of 1" water column through the filter. The density of the glass cotton in the above filter is approximately 3.6 grams per cubic inch.

Figure 3:
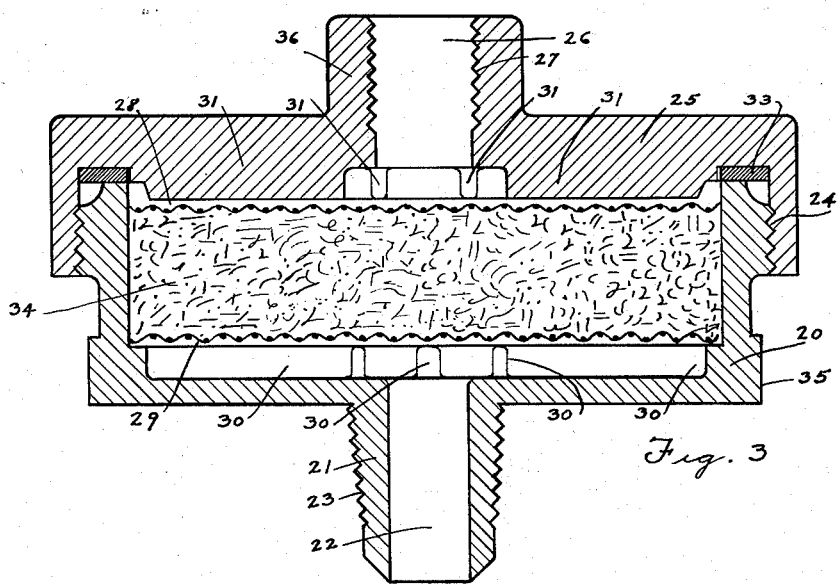
Figure 3 shows a vertical cross section of a filter for gas refrigerator burners.
Figure 4:
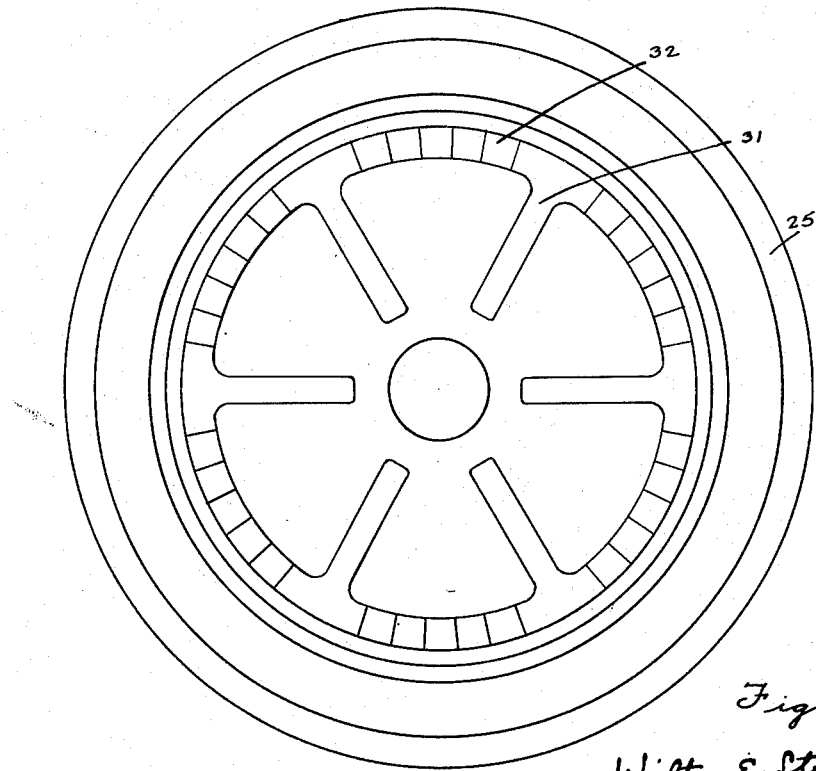
Figure 4 shows a plan view of the underside of the cover in Figure 3.

Referring to Figures 3 and 4.

Figure 2:
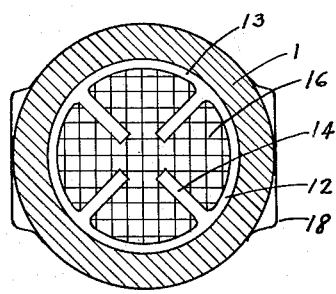
Figure 2 shows a horizontal cross section along the line 2—2 in Figure 1.

These figures illustrate a larger filter differing in some details from that in Figs. 1 and 2.

20 indicates the filter chamber member having an interior bore, providing the filter chamber and provided with the lug 21 having the passage 22 communicating with the filter chamber, and provided with the pipe threads 23.

The member 20 is provided with threads 24, adapted to engage the threads of the cover 25. The cover 25 is provided with the passage 26, which communicates with the interior of the chamber and which is provided with pipe threads as at 27. 28 and 29 are screens similar to those of Figs. 1 and 2. Instead of discrete spiders for supporting the screens and for providing gas distributing spaces, spiders are formed in the base of member 1, as indicated at 30 and in the underside of the cover 25, as indicated at 31. The latter is shown more clearly in Fig. 4. 33 is a gasket to provide gas tight contact between the cover 25 and the chamber member 20. 34 is a filter pad of compressed glass cotton.

As in Figs. 1 and 2, the parts are preferably accurately dimensioned to provide a space for compressed glass cotton of accurately predetermined area and depth to facilitate the securing of the proper density and depth in the compressed filter pad.

The assembly of the apparatus of Figs. 3 and 4 is similar to that described in connection with Figs. 1 and 2, except for the changes due to the fact that the spiders are integral with the filter chamber member and cover and that a gasket is employed. As in Figs. 1 and 2, the preferred method of assembly includes the compression of a weighed quantity of glass cotton to an accurately predetermined volume, depth and density.

As an example of a larger filter a filter having a bore of 2.3 inches, 0.75 deep and having its spiders and screens dimensioned to give a space for glass cotton 0.5 inch deep and provided with 7.5 grams of glass cotton will deliver approximately 7.0 cubic feet of gum free gas with a pressure drop not materially exceeding 1 inch of water column.

The glass cotton employed is not to be confused with glass silk and glass wool, which are of coarser fiber dimensions and are unsuitable for filtering out vapor phase gum particles.

As an illustration average fiber diameters of glass cotton are of the order of from 2 to 3 microns which is very much smaller than the average fiber diameters of glass wool or glass silk.

The glass cotton filters above described filter out vapor phase gum particles very effectively. There is a tendency, however, for a concentration of the gum particles in the initial layers of the glass cotton, instead of a more uniform penetration. I have found it advantageous to employ a layer of rock wool on the entrance side of the glass cotton as a pre-filter, which removes larger particles as well as some of the smaller ones and secures a deeper penetration and a longer filter element life. In such case the depth of the glass cotton may be reduced.

As an example of such a composite filter element the following is given.

In a filter having a chamber of 0.75 inch inside diameter and 0.7 inch deep, 0.6 gram of rock wool is compressed to a depth of 0.25 inch. This packing is followed by 0.45 gram of glass cotton and the total depth of the combined packing adjusted to 0.50 inch. Obviously the filter is connected so that the rock wool is on the inlet side.

Figure 5:
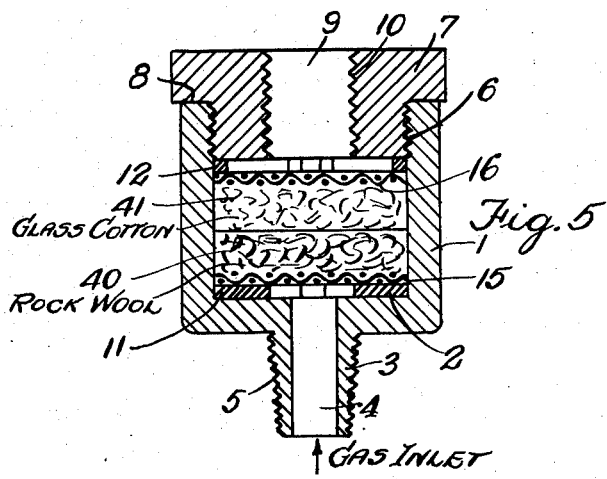
Figure 5 shows a vertical cross-section of a filter similar to that shown in Figure 1, but provided with a modified filter element.

Figure 5 shows a filter provided with a composite filter element in accordance with the foregoing description. In this figure the elements corresponding to similar elements in Figure 1 bear the same reference numerals and therefore need not be further described. Instead of the filter pad 17 of compressed glass cotton as shown in Figure 1, this modification comprises a composite filter element made up of rock wool 40 and glass cotton 41 preferably disposed in such a manner that the rock wool is disposed adjacent the gas inlet to the filter.

It is to be understood that after extended use the pressure drop across the filter will increase due to collection of gum in the interstices of the filter element eventually necessitating its renewal.

The apparatus of the invention has been described particularly in connection with the filtering of vapor phase gum particles from gas. It may have use in other applications. The figures illustrate forms of the invention chosen for illustration. Modifications will occur to those skilled in the art, without departing from the spirit of the invention, which is only limited as the prior art and the appended claims may require.

I claim:

1. A gas filter adapted to remove extremely minute vapor phase gum particles suspended in combustible gas flowing to a low rate appliance burner, comprising a filter casing having inlet and outlet openings, and a filter element of glass cotton arranged in said casing for the flow of said combustible gas therethrough, said filter element having a depth in the direction of gas flow of at least 0.25 inch, and said glass cotton having an average fiber diameter not substantially greater than 3 microns and a density between 3.2 grams per cubic inch and 4.1 grams per cubic inch.

2. A gas filter adapted to remove extremely minute vapor phase gum particles suspended in combustible gas flowing to a low rate appliance burner, comprising a filter casing having inlet and outlet openings, and a filter element of glass cotton arranged in said casing for the flow of said combustible gas therethrough, said filter element having a depth in the direction of gas flow of at least 0.25 inch, and said glass cotton having an average fiber diameter of the order of between 2 and 3 microns and a density between 3.5 grams per cubic inch and 4.1 grams per cubic inch.

3. A gas filter adapted to remove extremely minute vapor phase gum particles suspended in combustible gas flowing to a low rate appliance burner, comprising a filter casing having inlet and outlet openings, a layer of rock wool in said filter casing adjacent said inlet opening, a layer of glass cotton in said filter casing adjacent said outlet opening, said layers of rock wool and glass cotton being arranged in said casing for the flow of said combustible gas therethrough, and said layer of glass cotton having a density between 3.5 grams per cubic inch and 4.1 grams per cubic inch and a depth in the direction of said gas flow of at least 0.25 inch and an average fiber diameter not substantially greater than 3 microns.

4. A gas filter adapted to remove extremely minute vapor phase gum particles suspended in combustible gas flowing to a low rate appliance burner, comprising a filter casing having inlet and outlet openings, and a filter element of glass cotton arranged in said casing for the flow of said combustible gas therethrough, said glass cotton having an average fiber diameter not substantially greater than 3 microns and a density between 3.5 grams per cubic inch and 4.1 grams per cubic inch and a minimum depth in the direction of gas flow between 0.5 inch and 0.25 inch, said minimum depth varying inversely with said density in a linear relationship.

WILTON E. STACKHOUSE.